US009851934B2

(12) United States Patent
Ito (10) Patent No.: US 9,851,934 B2
(45) Date of Patent: Dec. 26, 2017

(54) PRINTING APPARATUS FOR MANAGING EXECUTION ORDER OF NEWLY GENERATED PRINT JOB AND PLURALITY OF PRINT JOBS, CONTROL METHOD THEREFOR, AND STORAGE MEDIUM

(71) Applicant: CANON KABUSHIKI KAISHA, Tokyo (JP)

(72) Inventor: Aya Ito, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/133,099

(22) Filed: Apr. 19, 2016

(65) Prior Publication Data
US 2016/0313951 A1 Oct. 27, 2016

(30) Foreign Application Priority Data

Apr. 23, 2015 (JP) .................... 2015-088578

(51) Int. Cl.
*G06F 3/12* (2006.01)
(52) U.S. Cl.
CPC ............ *G06F 3/126* (2013.01); *G06F 3/1213* (2013.01); *G06F 3/1258* (2013.01); *G06F 3/1286* (2013.01)
(58) Field of Classification Search
CPC ....... G06F 3/126; G06F 3/1262; G06F 3/1263
USPC ..... 358/1.9, 1.16, 403; 399/76, 87; 707/737, 707/741, 752
See application file for complete search history.

(56) References Cited

U.S. PATENT DOCUMENTS

| 5,327,526 A * | 7/1994 | Nomura ................ G06F 9/4881 358/1.15 |
| 6,433,884 B1 * | 8/2002 | Kawakami ............ G06K 15/00 358/1.15 |
| 2004/0099166 A1 * | 5/2004 | Blom .................... G06K 15/00 101/483 |
| 2010/0195141 A1 * | 8/2010 | Fan ........................ G06F 3/126 358/1.15 |
| 2011/0075202 A1 * | 3/2011 | Shirai .................. G06F 3/1211 358/1.15 |
| 2014/0085665 A1 * | 3/2014 | Sheldon ............ G06Q 10/0631 358/1.15 |

FOREIGN PATENT DOCUMENTS

| JP | 2004-114453 A | 4/2004 |
| JP | 2008-211434 A | 9/2008 |

* cited by examiner

*Primary Examiner* — Jamares Q Washington
(74) *Attorney, Agent, or Firm* — Canon U.S.A., Inc. IP Division (57) ABSTRACT

A printing apparatus includes a generation unit that generates a print job related to an increased portion of the number of prints in a case where the number of prints of a print job under printing is increased, and an addition unit that adds the print job generated by the generation unit to a position, from which a print job is taken and processed last, in a print standby queue where print jobs are processed in a sequential order, in order to minimize an influence on print end times of print jobs that are standing by in the printing apparatus.

9 Claims, 11 Drawing Sheets

| PRINT STANDBY QUEUE |||
|---|---|---|
| PRINT JOB NAME | THE NUMBER OF PRINTS | EXPECTED PRINT START TIME |
| JOB1 | 1000 | 9:30 |
| JOB2 | 300 | 9:40 |
| JOB3 | 100 | 9:43 |
| JOB4 | 800 | 9:44 |
| JOB5 | 640 | 9:55 |
|  |  |  |

PRINT JOB INFORMATION

| PRINT JOB NAME | USER | EXPECTED PRINT START TIME |
|---|---|---|
| JOB1 | A | 9:30 |
| JOB2 | B | 9:40 |
| JOB3 | C | 9:43 |

602

603 — FOR DETAILS

PRINT JOB DETAILED SETTINGS

PRINT JOB NAME:JOB1
SHEET SIZE:A4
THE NUMBER OF PRINTS:300 PRINTS

CHANGE — 614

612 — INTERRUPT    RESUME — 613

PRINTING APPARATUS FOR MANAGING EXECUTION ORDER OF NEWLY GENERATED PRINT JOB AND PLURALITY OF PRINT JOBS, CONTROL METHOD THEREFOR, AND STORAGE MEDIUM

BACKGROUND

Field

Aspects of the present invention generally relate to a printing apparatus, a control method therefor, and a storage medium.

Description of the Related Art

A printing apparatus having an image memory and a printing unit for printing on a sheet of paper has been known. In a case of printing a plurality of images with each image on a plurality of sheets, such a printing apparatus can print each image on a multiple number of sheets in a print job by reading the images only once.

Such a printing apparatus can speedily output a large number of prints by one time execution of a print job. On the other hand, if a user wants to change the number of prints for the print job currently printing, the user needs to cancel the printing, reselect the same print job, set the print settings again, and re-execute the printing. This results in an undue burden on the user.

To address this issue, Japanese Patent Application Laid-open Nos. 2008-211434 and 2004-114453 disclose means for changing the number of prints or a sheet type during printing or reading an image, while interrupting the execution of a print job. These techniques enable a user to change print settings for a print job currently printing. Their objectives are to make changes in the print settings easier and to shorten the time required for printing by removing the need to re-read and re-execute the same print job.

Office environments recent years have seen an increase in a plurality of users sharing one printing apparatus, where each user's information processing apparatus transmits a print job to the printing apparatus for printing. In such a case, a plurality of print jobs executed by a plurality of users is transmitted to one printing apparatus, and the print jobs are printed one after another. As a result, print jobs other than the print job currently printing have to wait temporarily in a standby queue or the like.

When a user, who transmitted the print job currently printing, changes the number of prints of the print job, the print start time for each subsequent print job in the standby queue is affected. In particular, an increase in the number of prints for the print job currently printing will result in a delay in printing the subsequent print jobs. In such a case, printouts may not be ready at the time expected by the user(s) who transmitted the subsequent print jobs.

SUMMARY OF THE INVENTION

Aspects of the present invention are generally directed to minimizing an influence on the print end times of other print jobs that are standing by in a printing apparatus when the number of prints for a print job currently printing is increased.

According to an aspect of the present invention, a printing apparatus includes a generation unit configured to generate, in a case where the number of prints of a print job under printing is increased, a print job related to an increased portion of the number of prints, and an addition unit configured to add the print job generated by the generation unit to an end position in a print standby queue where print jobs are processed in a sequential order.

Further features of aspects of the present invention will become apparent from the following description of exemplary embodiments with reference to the attached drawings.

DESCRIPTION OF THE EMBODIMENTS

Exemplary embodiments of the present invention will be described with reference to the drawings.

Figure 1:
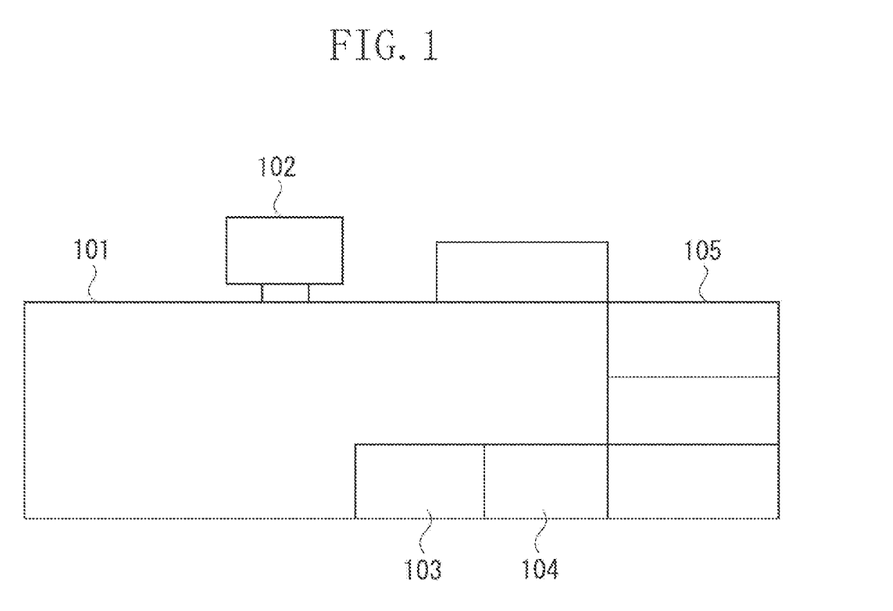
FIG. 1 is a schematic diagram illustrating a configuration of a printing apparatus.

A first exemplary embodiment is described. FIG. 1 is a schematic diagram illustrating a configuration of a printing apparatus. A printing apparatus using electrophotography is described here. The printing apparatus, however, may be a printing apparatus using a different image forming method such as an ink-jet method or an offset printing method.

A printing apparatus 101 includes a user interface (UI) panel 102, and paper feed decks 103 and 104. In addition, an optional deck 105 having three-tier paper feed decks is connected to the printing apparatus 101. The printing apparatus 101 is, for example, a printing apparatus using electrophotography. In addition, the UI panel 102 is a user interface having, for example, a capacitive touch panel.

Figure 2:
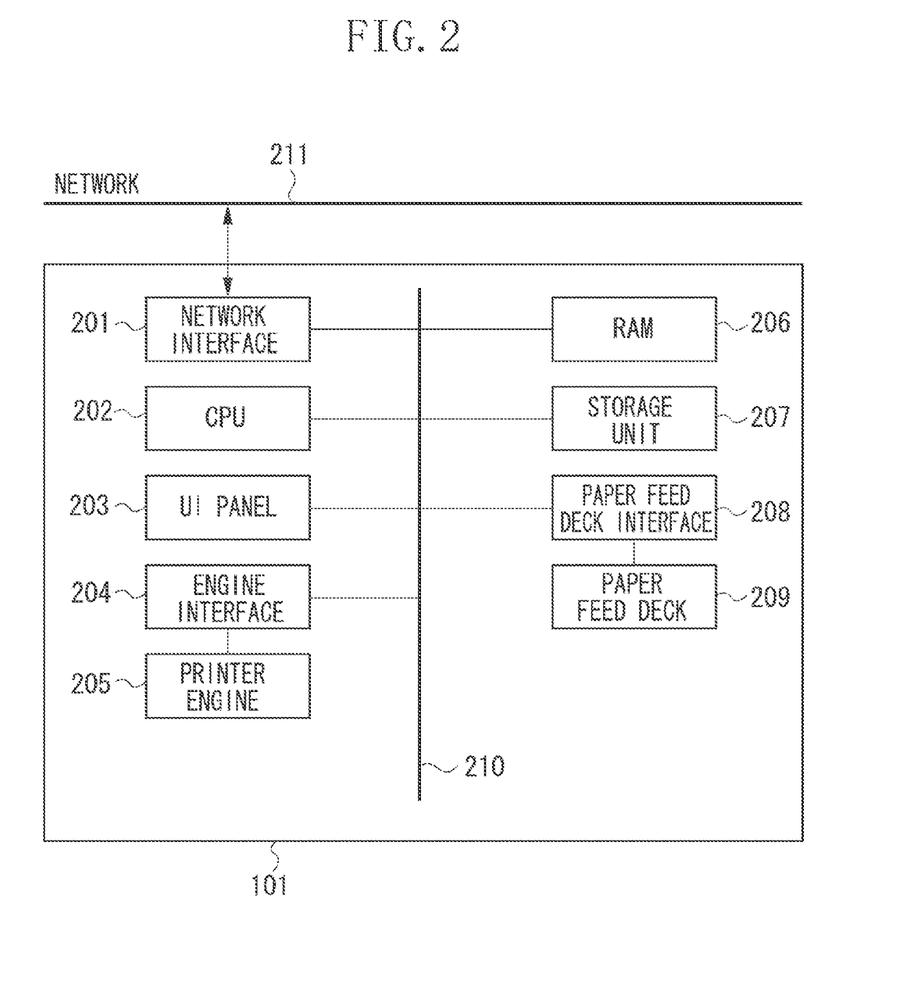
FIG. 2 is a diagram illustrating an example of a hardware configuration of the printing apparatus.

FIG. 2 is a diagram illustrating an example of a hardware configuration of the printing apparatus 101.

A network interface 201 performs communication via a network 211 with other apparatuses including a host computer. A central processing unit (CPU) 202 administers control and an operation in each unit in the printing apparatus 101 via a system bus 210. The CPU 202 executes a program that is stored in a storage unit 207 and is loaded into a random access memory (RAM) 206. Thereby, the CPU 202 implements a software configuration of the printing apparatus 101 and performs processing in flowcharts. The RAM 206 is a type of typical transitory storage device that can be directly accessed by the CPU 202. The RAM 206 is used as a work area for the CPU 202 or as a temporary data storage area for other purposes. The storage unit 207 functions as a temporary storage area and a work memory when the printing apparatus operates. An engine interface 204 administers communication with and control over a printer engine 205. A paper feed deck interface 208 administers communication with and control over a paper feed deck 209. The paper feed decks 103 and 104, and the paper feed decks in the optional deck 105 are hereinafter referred to generally as the paper feed deck 209 in a hardware configuration.

A UI panel 203 represents a hardware configuration of the UI panel 102. The UI panel 203 is a user interface for enabling a user to perform all the operations of the printing apparatus 101. In the present exemplary embodiment, the UI panel 203 is configured to have a capacitive touch panel.

Figure 3:
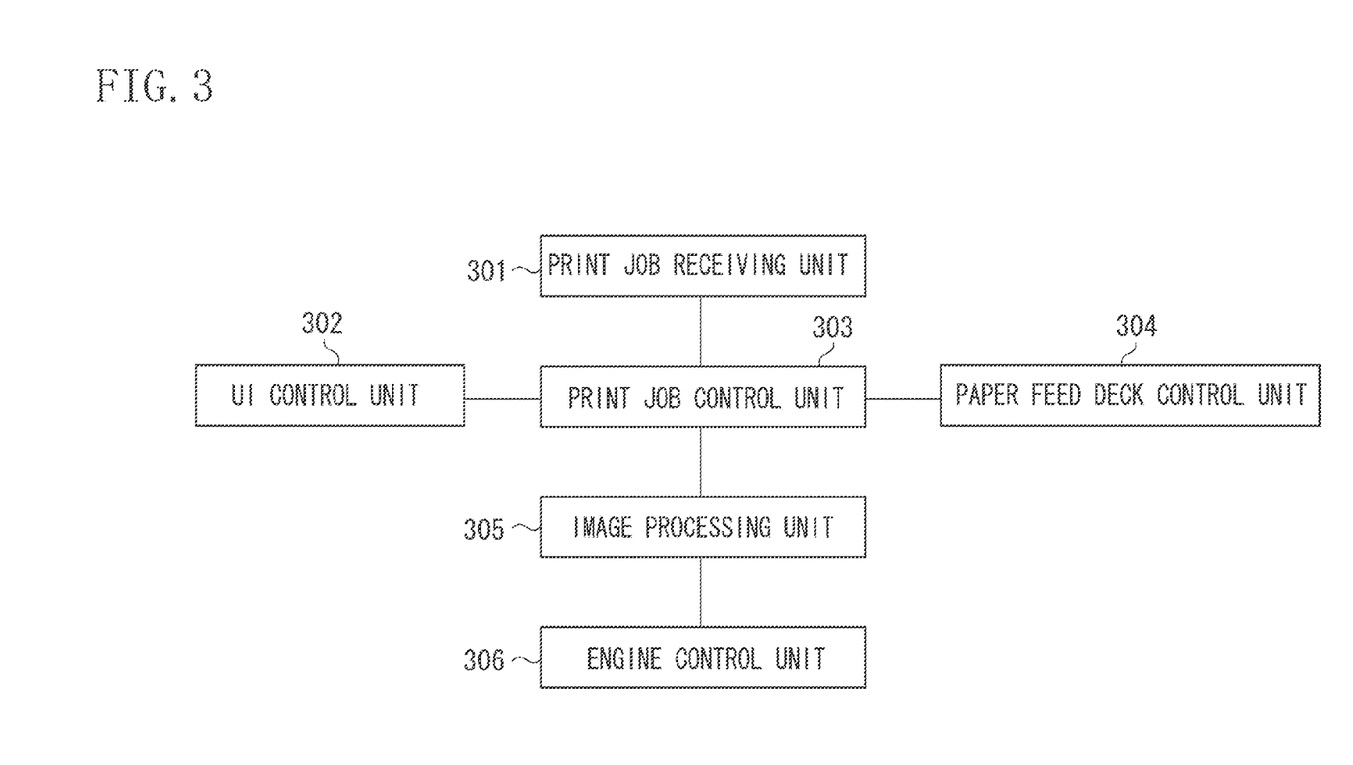
FIG. 3 is a diagram illustrating an example of a software configuration of the printing apparatus.

FIG. 3 is a diagram illustrating an example of a software configuration of the printing apparatus 101.

A print job receiving unit 301 receives a print job via the network interface 201 from an external device or from the inside of the printing apparatus. A print job control unit 303 obtains the print job from the print job receiving unit 301 and administers principal control over the print job.

A UI control unit 302 forms a screen image representing a status of the print job and a device state, which are received from the print job control unit 303, and displays the screen image on the UI panel 203. The UI control unit 302 controls the touch panel included in the UI panel 203 and converts coordinates information associated with a user input.

The print job control unit 303 obtains the coordinates information from the UI control unit 302. A paper feed deck control unit 304 controls the paper feed deck interface 208 to obtain information about sheets loaded in the paper feed deck 209. The print job control unit 303 obtains the information about the sheets in the paper feed deck 209 from the paper feed deck control unit 304.

An image processing unit 305 processes page description language (PDL) information and generates a raster image. The PDL is a language for describing instructions to control a page printer. PostScript (PS) and Printer Control Language (PCL) are representative examples of the PDL. The image processing unit 305 obtains current image forming information from the print job control unit 303 and forms an output image.

An engine control unit 306 transmits a page image, which is formed by the image processing unit 305, to the printer engine 205 via the engine interface 204. The printer engine 205 forms an image on a sheet of paper based on, for example, electrophotography.

Figure 4:
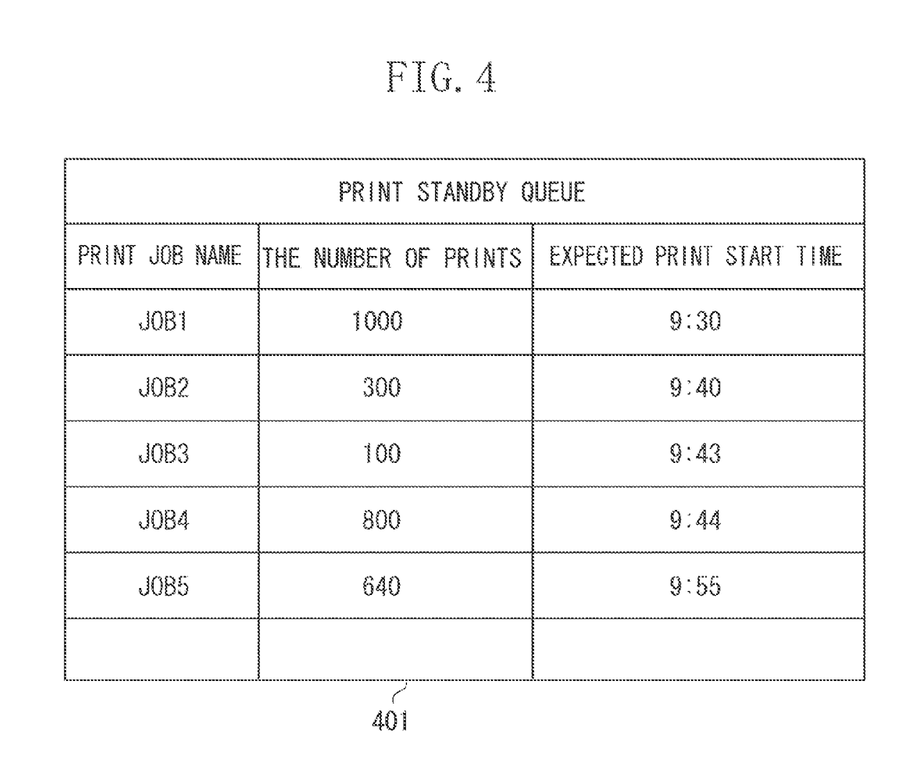
FIG. 4 is a diagram illustrating an example of a print standby queue.

FIG. 4 is a diagram illustrating an example of a print standby queue that is stored in the storage unit 207 of the printing apparatus 101. A print standby queue 401 includes a header containing a print job name, the number of prints, and an expected print start time. The print job control unit 303 is configured to calculate the expected print start time by using, for example, the number of pages for each print job and the printing speed of the printing apparatus 101. The header of print standby queue 401 according to the present exemplary embodiment is merely an example. The print standby queue may include, for example, a sheet size, the name of a user who has executed a print job, etc. The types and contents of the information included in the header are not limited thereto. The print standby queue 401 is an example of a print waiting line with which print jobs are processed in a sequential order.

Now, information processing of the present exemplary embodiment will be described by using a flowchart.

Figure 5:
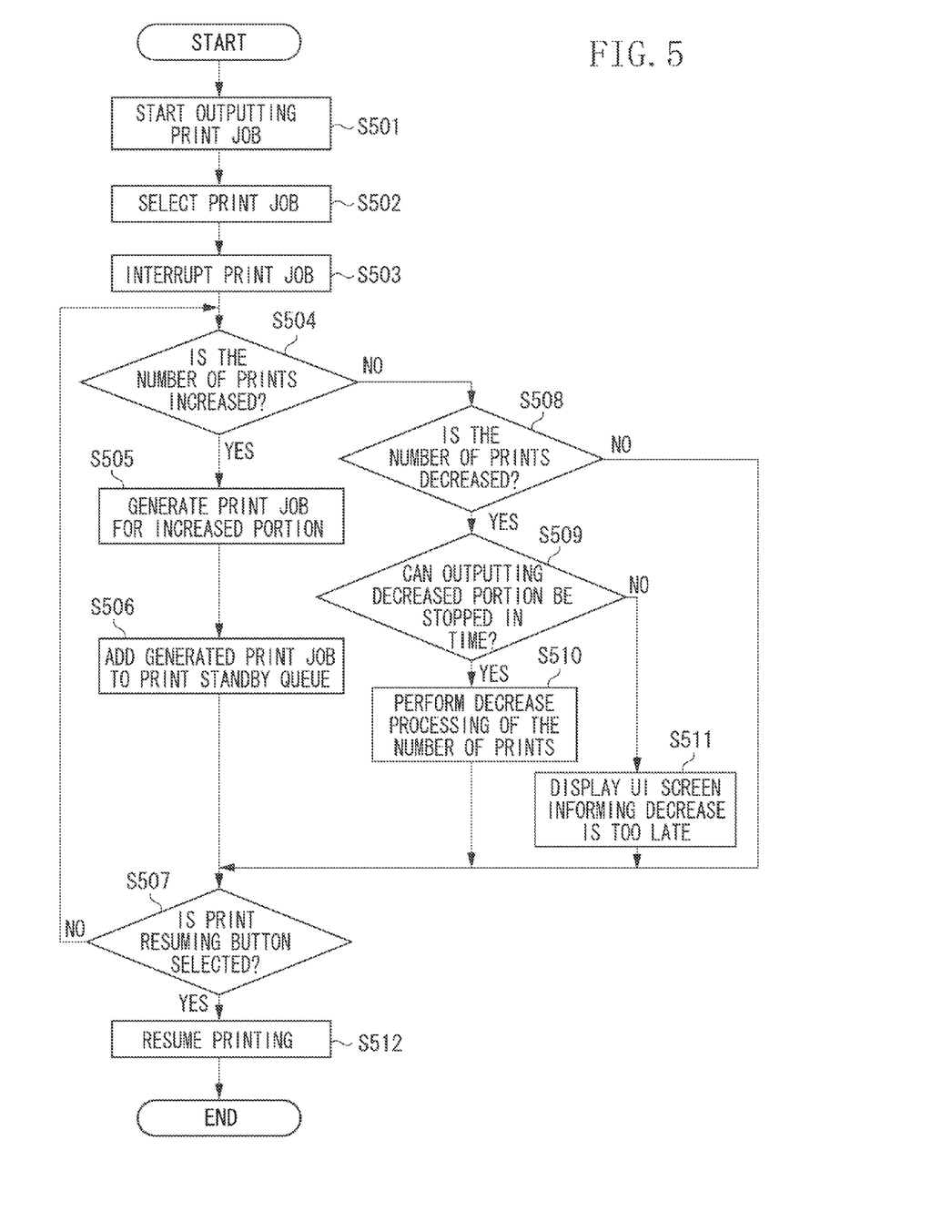
FIG. 5 is a flowchart illustrating information processing of the printing apparatus in a first exemplary embodiment.

FIG. 5 is a flowchart illustrating control of the printing apparatus 101 in the first exemplary embodiment.

In step S501, the print job control unit 303 starts executing a print job.

Figure 6A:
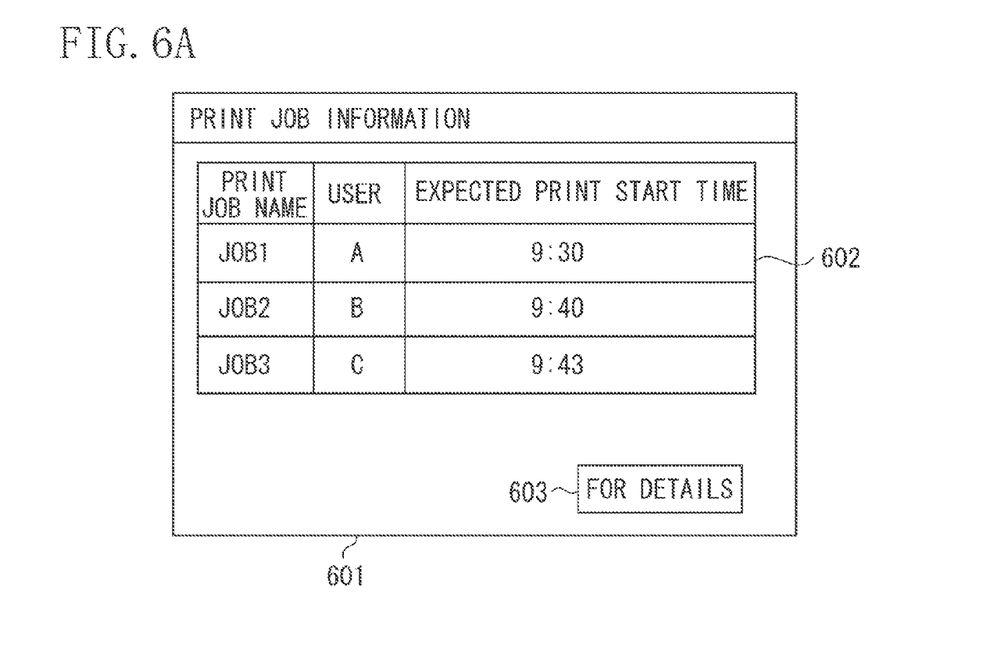
FIGS. 6A and 6B are diagrams illustrating examples of user interface (UI) screens displaying print job information.

In step S502, the UI control unit 302 displays a UI screen 601, which is illustrated in FIG. 6A, on the UI panel 203.

The UI screen 601 includes a print job information list 602 and a print job detailed settings browsing button 603. The print job information list 602 displays the names of print jobs, the names of users that have transmitted the print jobs to the printing apparatus 101, and expected times to start the print jobs. The header of the print job information in the present exemplary embodiment is merely an example, and the header may be configured to include, for example, the transmitted time of a print job and other items of information. When the UI control unit 302 detects that a user selects, for example, a print job "JOB1" in the print job information list 602 and presses the print job detailed settings browsing button 603, the processing proceeds to step S503.

Figure 6B:
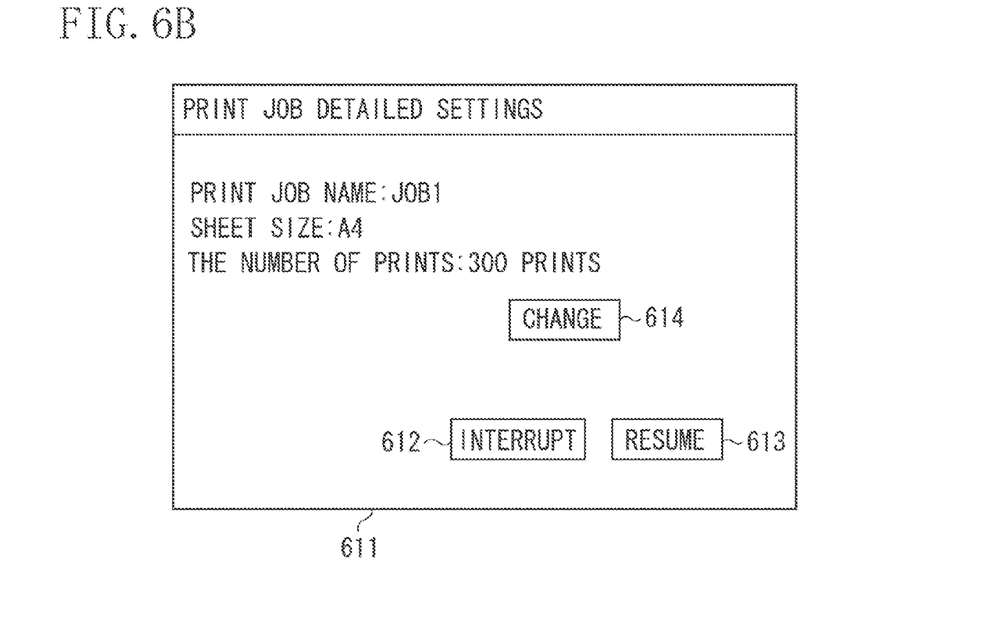

In step S503, the UI control unit 302 displays a print job detailed settings screen 611, which is illustrated in FIG. 6B, on the UI panel 203. The print job detailed settings screen 611 includes a print job name, a sheet size to be used, and the number of prints. The contents of the print job detailed settings according to the present exemplary embodiment are merely examples. The print job detailed settings may be configured to include, for example, a type of sheet, the time to start a print job. The types and contents of the information are not limited thereto. The print job detailed settings screen 611 further includes a print interrupt button 612, a print resuming button 613, and a button for changing the number of prints 614. When the UI control unit 302 detects interruption of printing via the print interrupt button 612, the UI control unit 302 notifies the print job control unit 303 of the interruption of printing. When the print job control unit 303 receives the notification, the print job control unit 303 interrupts the execution of the print job and notifies the paper feed deck control unit 304 and the UI control unit 302 of the interruption of the print job, and then the processing proceeds to step S504.

Figure 7A:
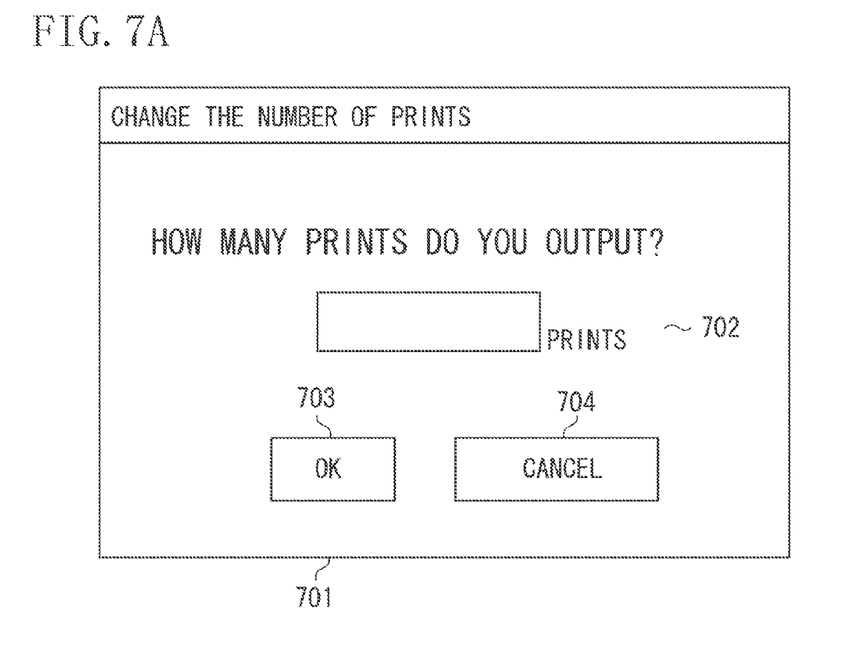
FIGS. 7A and 7B are diagrams illustrating examples of UI screens for changing the number of prints.

In step S504, if the button for changing the number of prints 614 is selected, the UI control unit 302 displays a screen for changing the number of prints 701, which is illustrated in FIG. 7A, on the UI panel 203. The screen for changing the number of prints 701 includes a text area for inputting the number of prints 702, a button for determining the number of prints 703, and a button for cancelling the change of the number of prints 704. If the UI control unit 302 detects that a user inputs the number of prints that is larger than the current number of prints in the text area for inputting the number of prints 702 and the user selects the button for determining the number of prints 703 (Yes in step S504), then the UI control unit 302 notifies the print job control unit 303 of the determination of the number of prints, and the processing proceeds to step S505.

In step S505, the print job control unit 303 generates a print job for the increased portion of the number of prints.

Subsequently, in step S506, the print job control unit 303 adds the generated print job to the end of the print standby queue 401. The print name for the generated print job may be "JOB1", which is the same as the original name, or may be, for example, "JOB1_COPY", which indicates that the generated print job is for the increased portion of the number of prints. The print settings of the print job for the increased portion are configured to inherit the print settings from the original print job. The end position in the print standby queue 401 is an exemplary position from which a print job is taken and processed last in a print waiting line.

In step S507, the UI control unit 302 displays the print job detailed settings screen 611 on the UI panel 203. At this time, the number of prints displayed on the screen is to be the number of prints after being increased. When the print resuming button 613 is selected, the UI control unit 302 notifies the print job control unit 303 of the resumption of printing, and then the processing proceeds to step S512.

In step S512, the print job control unit 303 notifies the paper feed deck control unit 304 of the resumption of printing, and then the processing in the flowchart illustrated in FIG. 5 ends.

In step S507, when the print resuming button 613 is not selected (No in step S507), the processing returns to step S504 and the UI control unit 302 waits for user's selection.

In step S504, if the UI control unit 302 detects that a user inputs the number of prints that is smaller than the current number of prints in the text area for inputting the number of prints 702 and the user selects the button for determining the number of prints 703 (No in step S504), then the processing proceeds to step S509 via step S508 (Yes in step S508).

In step S509, the UI control unit 302 notifies the print job control unit 303 of the decrease in the number of prints. The print job control unit 303 then notifies the paper feed deck control unit 304 of the decrease in the number of prints. The paper feed deck control unit 304 determines whether it is possible to stop outputting the decreased portion of the number of prints based on the feeding condition of the paper feed deck 209, in other words, whether it is possible to stop paper feeding in time in response to the specified decrease in the number of prints. When the paper feed deck control unit 304 determines that it is possible to stop paper feeding in time in response to the decrease in the number of prints (Yes in step S509), the paper feed deck control unit 304 notifies the print job control unit 303 of the determination, and the processing proceeds to step S510.

In step S510, the print job control unit 303 performs decrease processing of the number of prints, and the paper feed deck control unit 304 performs corresponding processing to stop paper feed. Subsequently, the print job control unit 303 advances the processing to step S507. The processing thereafter is performed in a way similar to that described above.

If, in step S509, the paper feed deck control unit 304 determines that paper has been already fed into a paper transport path for the execution of a print job, and it is not possible to stop paper feeding in time in response to the decrease in the number of prints, then the paper feed deck control unit 304 notifies the print job control unit 303 of the determination, and the processing proceeds to step S511.

Figure 7B:
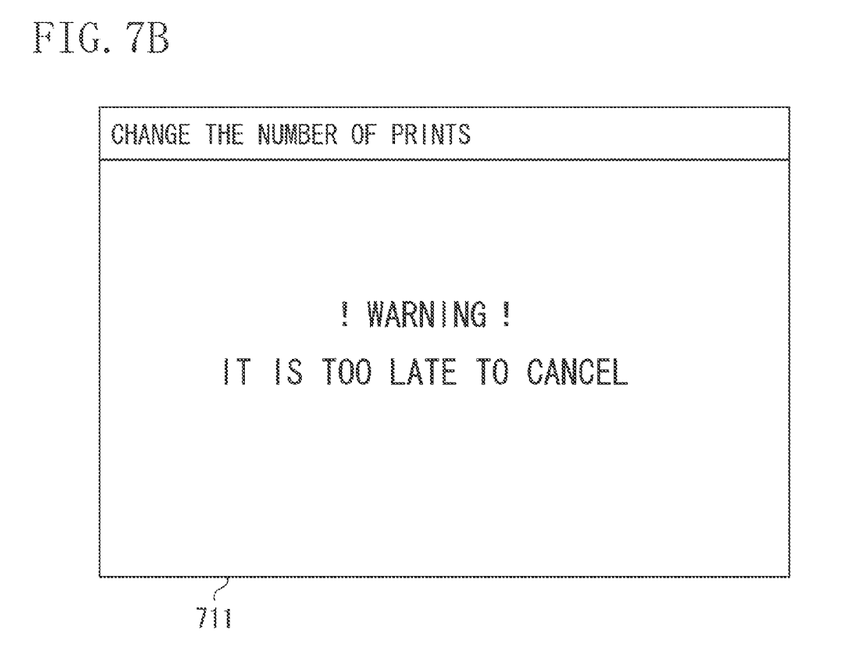

In step S511, the print job control unit 303 notifies the UI control unit 302 that it is too late to handle the decrease in the number of prints. The UI control unit 302 displays, on the UI panel 203, a UI screen 711 illustrated in FIG. 7B for informing that it is too late to handle the decrease in the number of prints. Subsequently, the print job control unit 303 advances the processing to step S507. The processing thereafter is performed in a way similar to that described above. The UI screen 711 is an example of a screen for informing that it is too late to handle the decrease in the number of prints.

When, in step S504, the UI control unit 302 detects the cancellation of the change of the number of prints via the button for cancelling the change of the number of prints 704, the processing proceeds to step S507 via step S508. The processing thereafter is performed in a way similar to that described above. In addition, if, in step S504, the UI control unit 302 detects that a user inputs the number of prints that is the same as the current number of prints in the text area for inputting the number of prints 702, and the user selects the button for confirming the number of prints 703, then the same processing as described above is performed thereafter. In other words, if the processing of the change in the number of prints is not performed in step S504, and the cancellation of the change of the number of prints is not performed either, then the UI control unit 302 advances the processing to step S507 via step S508.

The menu contents, the button contents and the types of buttons described in the present exemplary embodiment are merely examples. Menu items for other functions or options, which are not illustrated, may be included in the screens. In addition, the UI control unit 302 may perform exclusive processing, such as, for example, the print resuming button 613 can be pressed only when the print interrupt button 612 was pressed, or otherwise the print resuming button 613 is grayed out.

Further, it is described in the present exemplary embodiment that the print job control unit 303 is configured to perform a change in the number of prints after interrupting a print job that is currently under printing. However, the change in the number of prints may be performed while printing is going on.

In such a case, the printing of the print job may end before the change in the number of prints becomes effective. To deal with such a case, the print job control unit 303 may be configured not to start the next print job in the print standby queue 401 while changing the number of prints.

By the information processing described above according to the present exemplary embodiment, if a user increases the number of prints for the print job that is currently under printing, a print job for the increased portion of the number of prints is put at the end of the print standby queue. Thus, this can minimize an influence on the print end times of other print jobs in the print standby queue.

In the first exemplary embodiment, when the number of prints of a print job is increased, the print job control unit 303 generates a print job for the increased portion of the number of prints and adds the generated print job to the end of print standby queue 401 (in step S506). However, when print jobs transmitted by a plurality of users are waiting in the print standby queue, there is a possibility that, when all the print jobs are outputted, printouts of the print job of the increased portion ends up going to a destination different from the destination of printouts of the original print job prior to the increase processing. Moreover, printouts of other user's print jobs may be sandwiched between the printouts of the print job of the increased portion and the printouts of the original print job prior to the increase processing. In such a case, the printouts of the original print job prior to the increase processing and the printouts of the print job of the increased portion are separated, although they are derived from the same print job, so that it takes time to obtain final products.

Now, in a second exemplary embodiment, the printing apparatus 101 performs processing to lock a printout destination for a print job for which a user wants to increase the number of prints. Locking the printout destination enables an original print job prior to the increase processing and a print job of the increased portion to be outputted to the same destination. In other words, printouts of other print jobs can be prevented from outputting between the printouts of the original print job prior to the increase processing and the printouts of the print job of the increased portion.

The second exemplary embodiment is described by using a flowchart. In the description of the present exemplary embodiment, only differences from the first exemplary embodiment are mainly described so that duplicated explanation is omitted.

Figure 8:
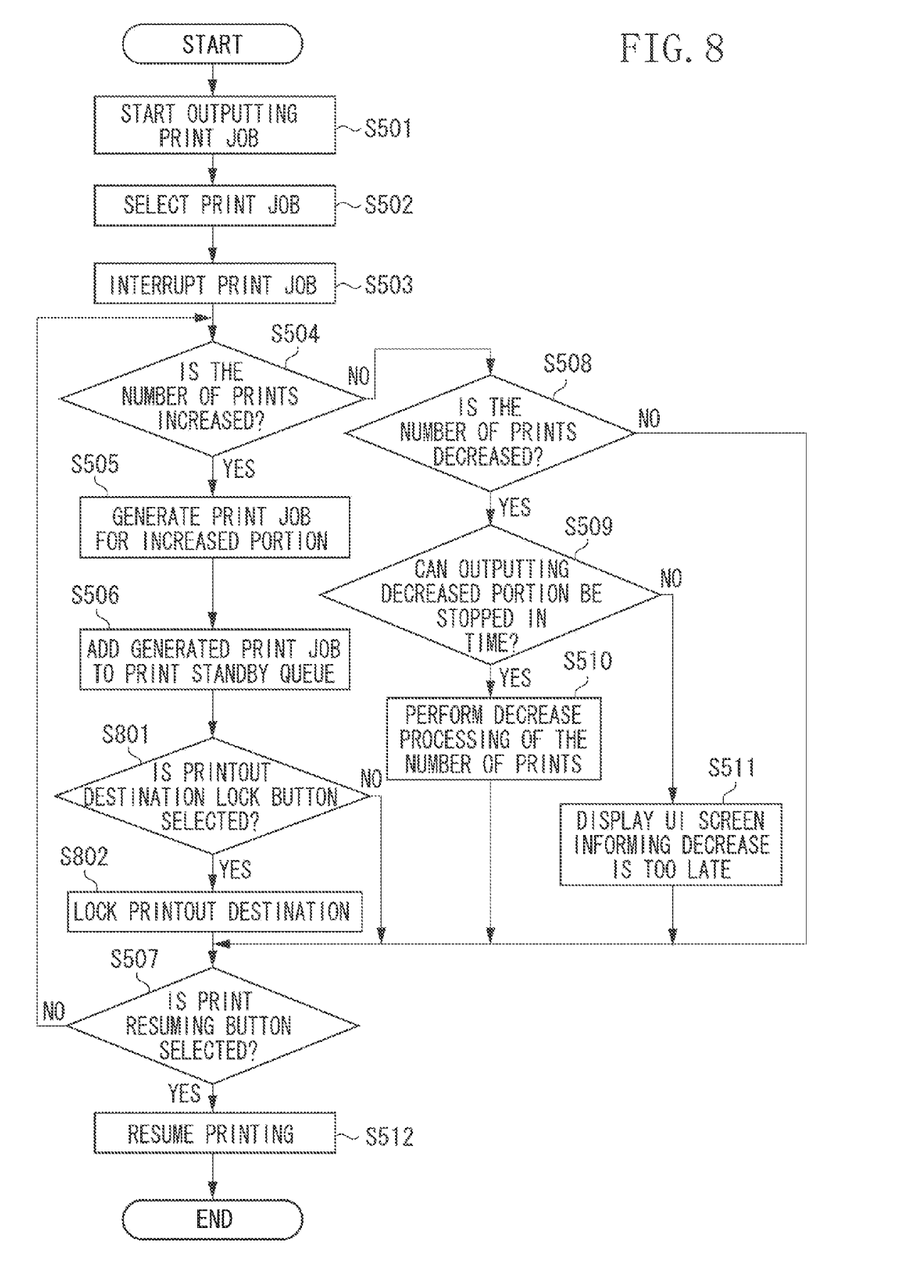
FIG. 8 is a flowchart illustrating information processing of a printing apparatus in a second exemplary embodiment.

FIG. 8 is a flowchart illustrating information processing of the printing apparatus 101 in the second exemplary embodiment.

Figure 9:
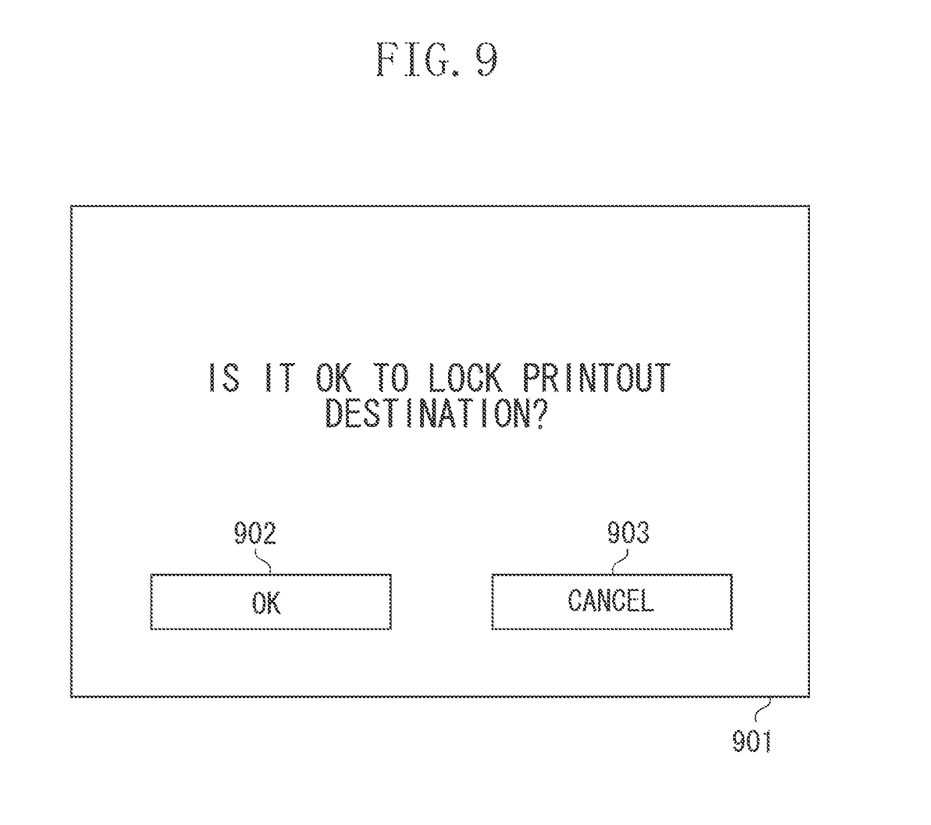
FIG. 9 is a diagram illustrating an example of a UI screen for instructing printout destination lock.

The processing from step S501 through step S506 illustrated in FIG. 8 is similar to that in the first exemplary embodiment, and the description thereof is omitted. In step S801, the UI control unit 302 displays a printout destination lock screen 901, which is illustrated in FIG. 9, on the UI panel 203. This processing is an example of processing for displaying a first selection screen. The printout destination lock screen 901 includes a printout destination lock button 902 and a printout destination lock cancellation button 903. When, in step S801, the UI control unit 302 detects printout destination lock via the printout destination lock button 902, the UI control unit 302 notifies the print job control unit 303 of the printout destination lock, and the processing proceeds to step S802. The printout destination lock screen 901 is an example of a first selection screen.

In step S802, the print job control unit 303 processes the printout destination lock of a print job "JOB1". The processing of the printout destination lock as used herein refers to that the printouts of "JOB1" and the printouts of the increased portion of "JOB1" are outputted to the same destination, and the printouts of other print jobs are not outputted to the same destination as that of "JOB1" and the increased portion of "JOB1" between printouts thereof.

If, in step S801, the UI control unit 302 detects, via the printout destination lock cancellation button 903, that the printout destination is not locked, then the processing proceeds to step S507. The processing thereafter is performed in a way similar to that described above in the first exemplary embodiment.

In the present exemplary embodiment, the printing apparatus 101 allows a user to select whether to lock the printout destination after the increase in the number of prints has been instructed. However, the printing apparatus 101 may allow a user to determine, in advance in a user registration screen or the like, whether to always lock the printout destination when the number of prints in a print job is increased.

By the information processing described above according to the present exemplary embodiment, even if a user increases the number of prints while printing goes on, the original print job prior to the increase processing and the print job of the increased portion are outputted together to the same printout destination, thereby preventing the printouts of other print jobs from mixing therebetween.

In the first and second exemplary embodiments, when the number of prints of a print job is increased, the print job control unit 303 generates a print job for the increased portion of the number of prints, and adds the generated print job to the end of the print standby queue 401 (in step S506). However, when a large number of print jobs are waiting in the print standby queue, it requires a considerable amount of time to finish printing the print job of the increased portion. This may cause trouble to a user in his or her output schedule, when the print job, in which the number of prints is increased, needs to be urgently outputted.

Now, for a print job for which a user wants to increase the number of prints, a third exemplary embodiment provides processing to allow a user to select whether to output the print job of the increased portion successively after the original print job prior to the increase processing, or to add the print job of the increased portion to the end of the print standby queue. This processing, when enabled, can optimize scheduling for all the print jobs in the print standby queue including a print job in which the number of prints is changed.

The third exemplary embodiment is described by using a flowchart. In the description of the present exemplary embodiment, only differences from the first exemplary embodiment are mainly described so that duplicated explanation is omitted.

Figure 10:
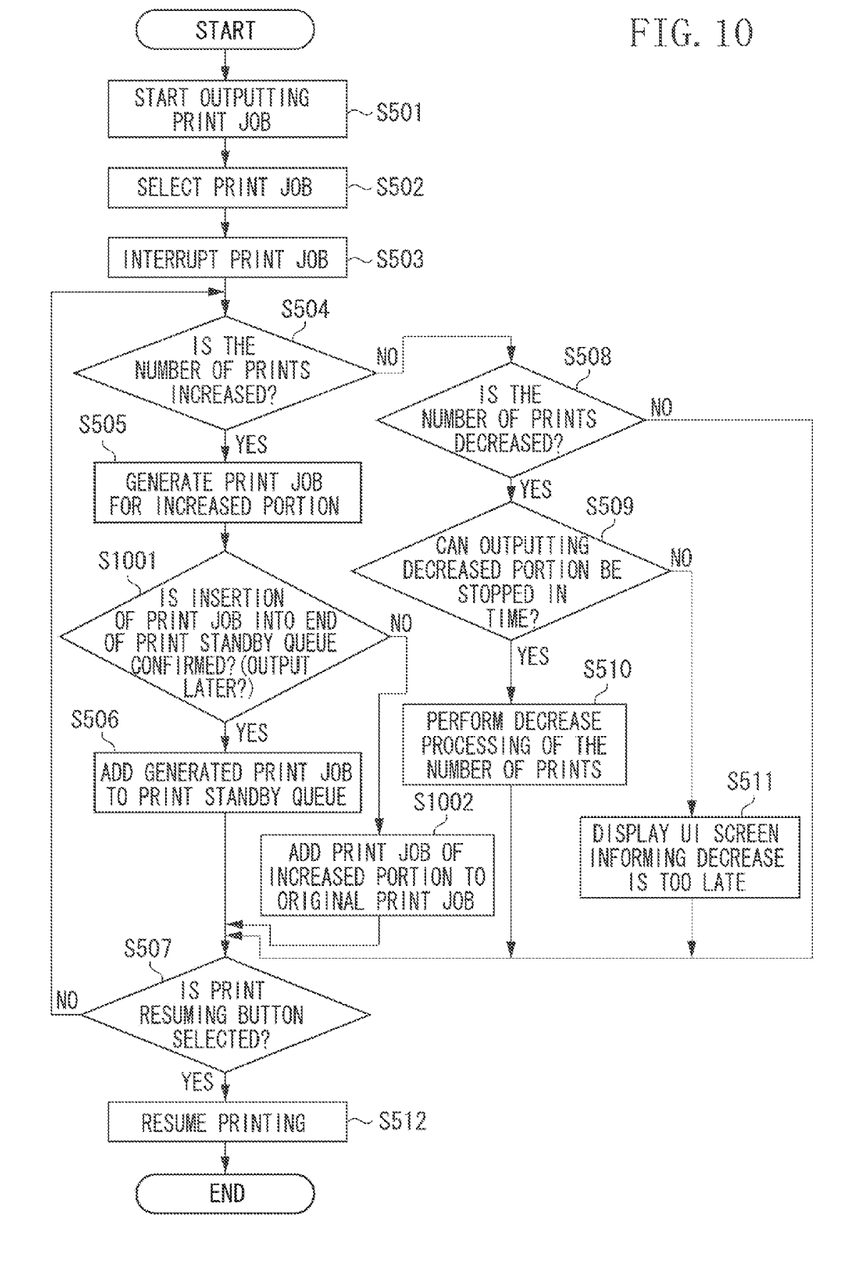
FIG. 10 is a flowchart illustrating information processing of a printing apparatus in a third exemplary embodiment.

FIG. 10 is a flowchart illustrating information processing of the printing apparatus 101 in the third exemplary embodiment.

Figure 11:
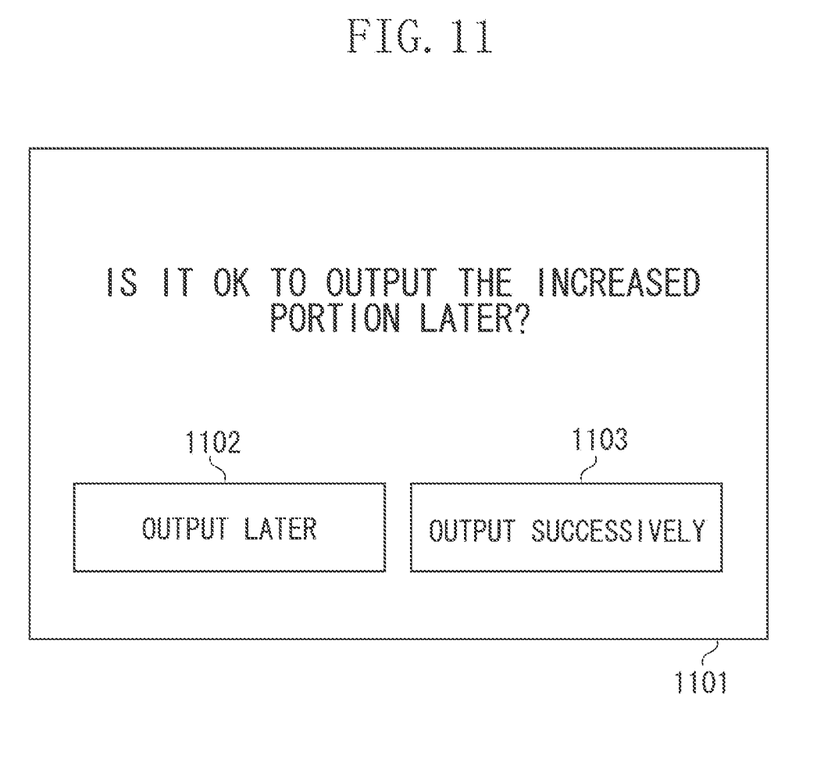
FIG. 11 is a diagram illustrating an example of a UI screen for selecting a location into which a print job for an increased portion of the number of prints is inserted.

The processing from step S501 through step S505 illustrated in FIG. 10 is similar to that in the first exemplary embodiment, and the description thereof is omitted. In step S1001, the UI control unit 302 displays a print job insertion place confirmation screen 1101, which is illustrated in FIG. 11, on the UI panel 203. In the print job insertion place confirmation screen 1101, a user is asked to confirm whether the user wants to add the print job of the increased portion to the end of the print standby queue 401. The print job insertion place confirmation screen 1101 includes an "output later" button 1102, with which the print job of the increased portion is added to the end of the print standby queue 401, and an "output successively" button 1103, with which the print job of the increased portion is outputted successively after the original print job prior to the increase processing. The print job insertion place confirmation screen 1101 is an example of a second selection screen, and the processing in step S1001 is an example of processing for displaying a second selection screen.

When, in step S1001, the UI control unit 302 detects, via the "output later" button 1102, that the print job of the increased portion is added to the end of the print standby queue 401, the processing proceeds to step S506. The processing thereafter is performed in a way similar to that described above in the first exemplary embodiment.

When, in step S1001, the UI control unit 302 detects, via the "output successively" button 1103, that the print job of the increased portion is outputted successively after the original print job prior to the increase processing, the processing proceeds to step S1002.

In step S1002, the print job control unit 303 increases the number of prints according to the number specified for the print job "JOB1", and performs a setup to enable outputting all the number of prints including the increased portion together. Subsequently, the print job control unit 303 advances the processing to step S507. The processing thereafter is performed in a way similar to that described above in the first exemplary embodiment.

In the present exemplary embodiment, the printing apparatus 101 allows a user, after an increase in the number of prints has been instructed, to select whether to output the print job of the increased portion successively after the original print job prior to the increase processing. However, the printing apparatus 101 may allow a user to determine in advance, in a user registration screen or the like, whether to always output the print job of the increased portion successively after the original print job prior to the increase processing when the number of prints is increased. In addition, when the number of prints is changed, the printing apparatus 101 may compare a name of a user who has transmitted the print job currently under printing to a name of a user who has selected that print job from the print jobs waiting in the print standby queue 401 in the printing apparatus 101. At this time, if the printing apparatus 101 determines that both user names are the same, then the print job of the increased portion may be added to the end of the print standby queue 401. If both user names are determined not to be the same, then the print job of the increased portion may be outputted successively after the original print job prior to the increase processing.

With the information processing described above according to the present exemplary embodiment, when a user increases the number of prints for a print job currently under printing, the user is allowed to select whether to output the print job of the increased portion successively after the original print job prior to the increase processing, or to add the print job to the end of the print standby queue. As a result, the scheduling of all the print jobs in the print standby queue can be optimized.

Aspects of the present invention are not limited to exemplary described above.

For example, a printing system may include a single device or a plurality of devices as far as the above described functions of the exemplary embodiments can be performed. Further, a printing system may be connected via a network such as Local Area Network (LAN) or Wide Area Network (WAN) to perform processing, as far as the above described functions of the exemplary embodiments can be performed.

According to each embodiment described above, when the number of prints is increased for a print job under printing, an influence on the print end times of other print jobs waiting in the printing apparatus can be minimized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-088578, filed Apr. 23, 2015, which is hereby incorporated by reference herein in its entirety.

What is claimed is:

1. A printing apparatus comprising:
a memory;
one or more processors configured to function as units in accordance with a program loaded to the memory, the units comprising:
a management unit configured to manage an execution order of a plurality of print jobs in each of which the number of copies is set;
a reception unit configured to receive, for one print job among the plurality of print jobs, an instruction to increase the number of copies so that the number of copies to be printed is greater than the number of copies set in the one print job; and
a generation unit configured to generate a new print job for performing printing for a portion, which has been increased based on the instruction, of the increased number of copies of the one print job,
wherein the management unit is configured to manage the execution order of the new print job generated by the generation unit and the plurality of print jobs so that the new print job is to be executed after the managed plurality of print jobs is executed, and
wherein the one or more processors are configured to further function as:
another reception unit configured to receive, for one print job among the plurality of print jobs, an instruction to reduce the number of copies set in the one print job so that the number of copies to be printed is fewer than the number of copies set in the one print job;
a determination unit configured to determine whether sheet feeding can be stopped before sheet feeding corresponding to the number of copies to be reduced is started; and
a reducing unit configured to reduce the set number of copies of the one print job in a case where the determination unit determines that sheet feeding can be stopped.

2. The printing apparatus according to claim 1, wherein the one or more processors are configured to further function as a display unit configured to display a screen informing that reducing of the number of copies cannot be implemented in a case where the determination unit determines that the sheet feeding cannot be stopped.

3. The printing apparatus according to claim 1, wherein the one or more processors are configured to further function as a printout destination locking unit configured to perform, when the new print job is generated, printout destination lock of printout destinations of the one print job and the new print job.

4. The printing apparatus according to claim 3, wherein the one or more processors are configured to further function as a first selection screen display unit configured to display a first selection screen enabling selection of whether to perform the printout destination lock,
wherein, in a case where the new print job is generated and the printout destination lock is selected, the printout destination locking unit performs the printout destination lock of the printout destinations of the one print job and the new print job.

5. The printing apparatus according to claim 1, wherein the one or more processors are configured to further function as a control unit configured to determine whether to process the new print job after the plurality of print jobs,
wherein, in a case where the control unit determines to process the new print job after the plurality of print jobs, the management unit manages the execution order of the plurality of print jobs and the new print job so that the new print job is to be executed after the managed plurality of print jobs is executed.

6. The printing apparatus according to claim 5, wherein, in a case where the control unit determines not to process the new print job after the plurality of print jobs, the management unit is configured to manage the execution order of the new print job and the plurality of print jobs so that the new print job is to be executed after the one print job.

7. The printing apparatus according to claim 1, wherein the one print job is under execution.

8. The printing apparatus according to claim 1, wherein, before the new print job is generated, an expected time of starting job execution is set for each of the plurality of print jobs.

9. The printing apparatus according to claim 8, wherein, after the new print job is generated, the plurality of print jobs is each executed at their respective set expected time by the management unit managing the execution order of the new print job and the plurality of print jobs.

* * * * *